March 2, 1954  H. L. FULTON  2,670,808
TWO-WAY GREASE TRAP AND SEWER PIPE CLEANOUT FIXTURE
Filed Nov. 13, 1951
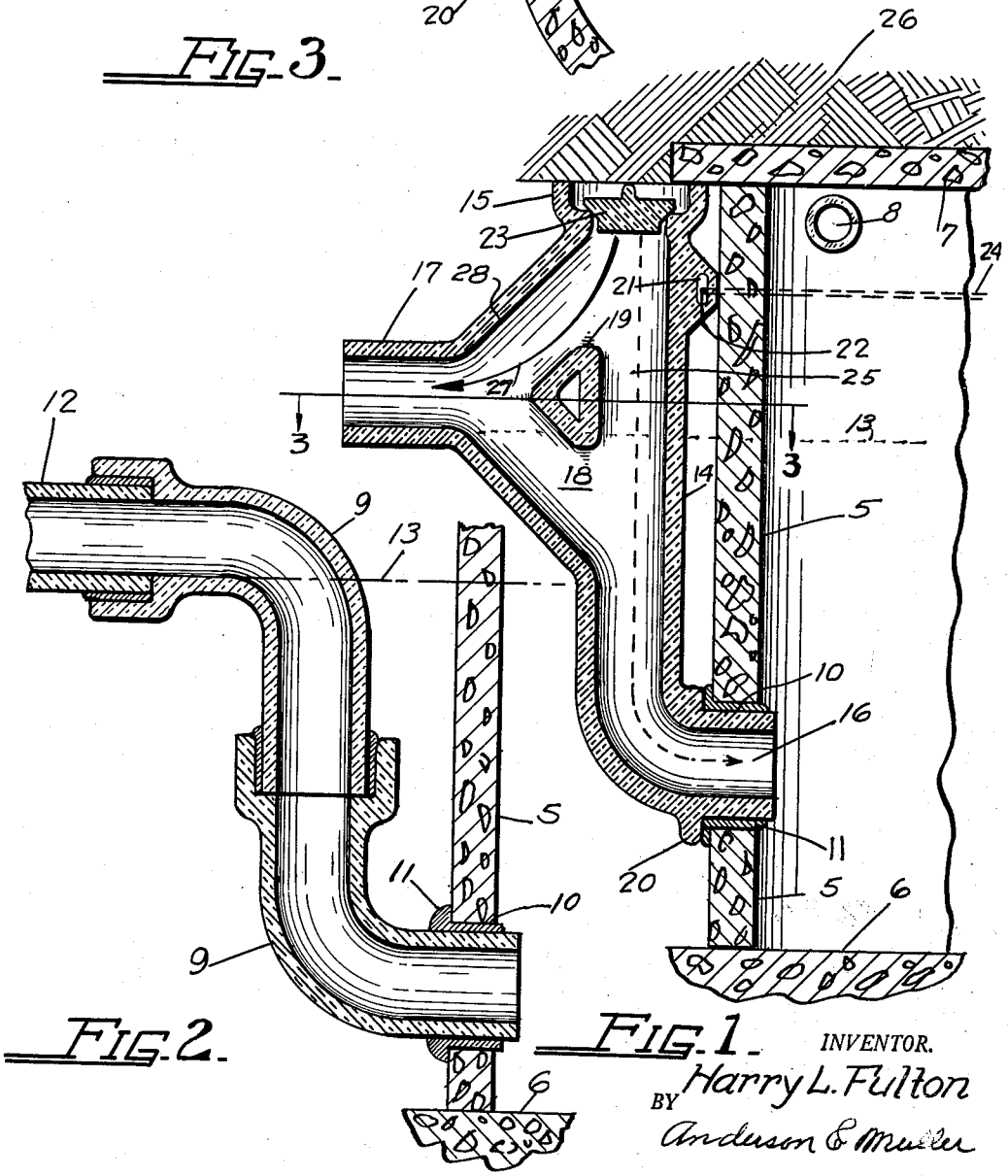
INVENTOR.
Harry L. Fulton
BY Anderson & Muller
ATTORNEYS Patented Mar. 2, 1954

2,670,808

UNITED STATES PATENT OFFICE 2,670,808

TWO-WAY GREASE TRAP AND SEWER PIPE CLEANOUT FIXTURE

Harry L. Fulton, Pueblo, Colo.

Application November 13, 1951, Serial No. 256,012

1 Claim. (Cl. 182—9)

This invention relates to improvements in fittings for grease traps and has reference in particular to a two-way grease trap and sewer cleanout fitting.

Sewers and grease traps frequently get stopped up due to the entrance of roots into the sewer pipes and to the plugging of the sewer inlet opening in the grease trap. If either of these stoppages takes place with the usual sewer installation, it requires a considerable amount of work and frequently a large expense to open the sewer pipe or to remove the plug from the inlet end of the sewer pipe fitting.

It is the object of this invention to produce a fitting of a construction somewhat similar to that shown in U. S. Patent 2,506,206 granted May 2, 1950, that will serve to make every grease trap a sewer clean-out station and to thereby facilitate the maintenance of the sewer and the grease trap in operative condition.

This invention can be most clearly explained and be most readily understood when reference is had to the accompanying drawing in which it has been illustrated and in which Figure 1 is a diametric section through a grease trap and through the fitting to which this invention relates;

Figure 2 is a view somewhat similar to that shown in Figure 1 and shows the standard grease trap connection; and Figure 3 is a section taken on line 3—3, Figure 1.

Referring now to the drawing, reference numeral 5 designates the wall of a grease trap and reference numeral 6 represents the bottom thereof. The top of the grease trap is normally closed by a reinforced concrete lid 7; the grease trap and the lid being positioned a short distance below the surface of the ground as shown in the drawing. The sewage from the building is discharged into the grease trap through pipe 8.

Since the function of the grease trap is to separate grease and solid materials that are lighter than water, from the liquid sewage, it is necessary to arrange a discharge connection of such a nature that the liquid will leave the grease trap near the bottom thereof and thence rise through the sewer pipe fitting to a height at considerable distance from the bottom, all as shown in Figure 2. The usual manner of effecting a connection between the grease trap and the sewer is to employ two sewer pipe L's in the manner shown in Figure 2 where these fittings have been designated by reference numeral 9. The spigot end of the lower fitting extends into the grease trap through opening 10 and is held in position by a cement seal 11. The upper fitting 9 has its spigot positioned in the bell of the lower fitting and its bell connected with sewer pipe 12. The overflow level of the water is kept on line 13 with this construction. It is evident that when this type of fitting is employed there is no way of introducing a clean-out rod or wire into the sewer or into the fitting that connects with the grease trap.

In Figure 1, the applicant has shown his improved fitting applied to a grease trap in place of the two L's shown in Figure 2. The improved fitting consists of a substantially straight body, one side of which has been designated by reference numeral 14. This fitting is provided at its top with an ordinary bell 15 and the lower end terminates in a spigot 16 that extends at right angles to the longitudinal axis of the fitting. The fitting extends laterally and terminates in a spigot end 17. The two side walls of the fitting which have been numbered 18, are joined by means of a triangular strut 19.

The strut 19 is offset from the wall 14 to such extent and so arranged that one of its flat sides is parallel to the wall and forms therewith a part of a straight elongated passage 25. The fitting has, for discharge into the spigot end 17, a flared portion 28 one wall of which forms, with the strut, a discharge and clean-out passage (see arrow 27).

From Figure 3, which shows a section taken on line 3—3 Figure 1, it will be observed that sides 18 are substantially flat.

The spigot end 16 is provided with a flange 20 that serves to space the fitting away from the outside wall of the grease trap. A spacing element 21 is provided near the top of the fitting and has an opening 22 for the reception of a wire, band or other tie 24 by means of which it is held in position on the grease trap while the concrete seal 11 is put into position. A cover or plug 23 is positioned in bell 15 as shown in the drawing. The top of bell 15 is substantially at the level of the under surface of the concrete lid and the latter is so positioned that it projects over the opening in the bell so that when the lid is removed the bell will become visible and this makes it unnecessary to spend any time in hunting for the top of the fitting. After the trap has been built and the parts positioned it is covered by a layer of soil 26.

It may be seen from the drawing that when the lid is removed from the grease trap and plug 23 is removed from the bell, a clean-out rod, wire or other device can be pushed downwardly and into the grease trap through the spigot 16. If there is an obstruction in the sewer, the clean-out device can be run outwardly in the manner indicated by arrow 27. It is, therefore, possible to remove obstructions from the lower end of the fitting and from the sewer pipe by inserting the clean-out tool through the open end of the fitting.

Attention is called to the construction of this fitting and to the convenient way in which the sewer may be cleaned by the use thereof. When the construction shown in Figure 2 is employed it is necessary to break the pipe at some place if a cleaning tool is to be inserted into the sewer and after such breakage, the pipes are very seldom properly repaired.

In some cases, ordinary T-fittings are employed for the vertical portion of the sewer pipe adjacent the grease trap. When such fittings are used it is possible to run a clean-out device down into the grease trap, but it is not possible to get a cleaning tool into the sewer pipe where the obstruction usually is. The fact that this is a double purpose fitting that permits a cleaning rod or device to be inserted into the sewer pipe as well as into the grease trap makes it possible to remove obstructions from either place without damaging the pipe.

Having described the invention, what is claimed as new is:

In a combination sewage disposal and clean-out device for use as a sewage outlet for a grease trap, a pipe having a vertical clean-out and drainage passageway with an open upper end for purposes of inspection and of insertion of a cleaning tool; an elbow at the lower end of said pipe for connection to a grease trap; said pipe having an outwardly tapering flared portion between its ends to provide a discharge spigot, said flared portion including a horizontal strut whose cross section in the plane of the vertical drainage passage is triangular, one side being vertical forming a portion of the wall of the vertical drainage passage, the upper and lower sides of the strut being spaced from and respectfully parallel with the top and the bottom surface of the outwardly tapering flared portion forming an upper outwardly and downwardly inclined passage for the guidance of a flexible clean-out tool, the upwardly and outwardly inclined passage forming an outlet for sewage from the grease trap, the vertical drainage passage and the elbow forming a passage for guiding a flexible clean-out tool into the grease trap to break up and remove obstructions.

HARRY L. FULTON.

References Cited in the file of this patent

UNITED STATES PATENTS

| Number | Name | Date |
|---|---|---|
| 1,801,262 | Boosey | Apr. 21, 1931 |
| 2,081,215 | Boosey | May 25, 1937 |
| 2,140,581 | Hirshstein | Dec. 20, 1938 |
| 2,506,206 | Fulton | May 2, 1950 |